United States Patent
Shin

(10) Patent No.: US 7,881,171 B2
(45) Date of Patent: Feb. 1, 2011

(54) METHOD FOR REPRODUCING OPTICAL RECORDING MEDIUM

(75) Inventor: Yun Sup Shin, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 995 days.

(21) Appl. No.: 11/391,546

(22) Filed: Mar. 29, 2006

(65) Prior Publication Data

US 2006/0291353 A1    Dec. 28, 2006

(30) Foreign Application Priority Data

Jun. 24, 2005    (KR) .................. 10-2005-0055171

(51) Int. Cl.
*G11B 15/52* (2006.01)
*G11B 7/00* (2006.01)

(52) U.S. Cl. ................. 369/47.54; 369/44.27

(58) Field of Classification Search ............ None
See application file for complete search history.

(56) References Cited

U.S. PATENT DOCUMENTS

| | | | | |
|---|---|---|---|---|
| 4,980,877 A * | 12/1990 | Sugiyama et al. | ....... | 369/44.41 |
| 5,666,345 A * | 9/1997 | Takahashi et al. | ....... | 369/275.1 |
| 5,859,822 A | 1/1999 | Inoue et al. | | |
| 5,912,869 A | 6/1999 | Tanaka et al. | | |
| 5,917,791 A | 6/1999 | Tsuchiya et al. | | |
| 6,021,012 A | 2/2000 | Bang | | |
| 6,469,965 B1 * | 10/2002 | Horita | ...... | 369/53.2 |
| 6,507,540 B1 * | 1/2003 | Berg et al. | ...... | 369/13.13 |
| 6,628,593 B1 | 9/2003 | Yamashita et al. | | |
| 6,798,734 B1 * | 9/2004 | Kawasaki et al. | ...... | 369/275.4 |
| 6,879,637 B1 | 4/2005 | Nakagawa et al. | | |
| 6,891,784 B2 * | 5/2005 | Yanagawa et al. | ....... | 369/47.22 |
| 7,477,583 B2 | 1/2009 | Kondo | | |
| 2002/0054561 A1 * | 5/2002 | Inase et al. | ........ | 369/275.3 |
| 2002/0067672 A1 * | 6/2002 | Yanagawa et al. | ........ | 369/53.19 |
| 2003/0218946 A1 * | 11/2003 | Huang et al. | ........ | 369/44.23 |
| 2004/0145990 A1 * | 7/2004 | Chang et al. | ........ | 369/53.24 |
| 2005/0174916 A1 * | 8/2005 | Yamanaka | ........ | 369/59.25 |
| 2006/0098544 A1 | 5/2006 | Oki | | |

FOREIGN PATENT DOCUMENTS

| | | |
|---|---|---|
| CN | 1151578 A | 6/1997 |
| JP | 5-151708 A | 6/1993 |
| JP | 5-347043 A | 12/1993 |
| JP | 9-251661 A | 9/1997 |
| JP | 11-306650 A | 11/1999 |
| JP | 2002-157768 A | 5/2002 |
| JP | 2005-93013 A | 4/2005 |

OTHER PUBLICATIONS

Machine Assisted Translation and English abstract of JP 05-515708 A.

* cited by examiner

*Primary Examiner*—Wayne R Young
*Assistant Examiner*—Carl Adams
(74) *Attorney, Agent, or Firm*—Birch, Stewart, Kolasch & Birch, LLP

(57) ABSTRACT

A method for reproducing an optical recording medium includes: determining a kind of optical pick-up device placed to reproduce an optical recording medium; detecting a push-pull signal or a pre-pit signal of an inserted recording medium according to the kind of optical pick-up device; and reproducing the optical recording medium by using an optical pick-up device from which the push-pull signal or the pre-pit signal is detected.

7 Claims, 7 Drawing Sheets

METHOD FOR REPRODUCING OPTICAL RECORDING MEDIUM

BACKGROUND OF THE INVENTION

1. Field of the Invention

The present invention relates to a method for reproducing an optical recording medium, and particularly, to a method for reproducing an optical recording medium capable of distinguishing between near-field and far-field optical recording media and interchangeably reproducing both types of optical recording media.

2. Description of the Related Art

In the current field of optical recording media, various technologies and recording media are being developed. The current optical recording media may be categorized into a far-field type and a near field type.

The near-field optical recording medium and far-field optical recording medium will now be described schematically.

FIG. 1 is a block diagram of an optical pick-up of a reproducing device that may reproduce a far-field optical recording medium, illustrating a configuration of an optical pick-up, which may reproduce a DVD.

The optical pick-up includes a laser diode 101, a collimator lens 102, a beam splitter 103, an objective lens 104, a cylindrical lens 105 and a photo diode 106.

In general, light generated from the laser diode 101 is emitted with oval intensity distribution. In order to efficiently concentrate light to the objective lens 104 having a circular incident surface, the intensity distribution of the emitted light is shaped into a circular form by using a beam shaping prism or the like.

The beam splitter 103 is used to detect light reflected by the optical disc.

When light transmitted through the beam splitter 103 passes through a λ/4 wavelength plate (not shown), linear polarized light is changed into circular polarized light by the λ/4 wavelength plate (not shown) and is made incident upon the objective lens 104.

Light incident upon the objective lens 104 is reflected by the optical disc 107 and is transmitted through the objective lens 104 again. Here, such reflection is made between the air having a low refractive index and the optical disc 107 having a high refractive index, so that the phase of the light is changed by 180°. In this case, the light shaped into the circular polarized light by the λ/4 wavelength plate (not shown) is changed into linear polarized light while transmitting the λ/4 wavelength plate (not shown) again, but its polarization direction is changed to be perpendicular to the initial polarization direction. Accordingly, most of light is reflected by the beam splitter 103 and is made incident upon the photo diode 106, thereby detecting an optical signal.

Research on various methods for increasing recording capacity of an optical recording medium is being conducted, and development of a Blueray disc (BD) is being made as well as a CD and DVD.

In order to increase the recording capacity of an optical recording medium, methods of reducing a wavelength of a laser beam or increasing the number of apertures (NA) of an objective lens are being studied.

However, when it comes to the Blueray disc, there is limit to the method of reducing a wavelength, and in the existing far-field method, increasing the number of apertures of an objective lens cannot contribute to the improvement of the recording capacity.

A near-field type using a recently-developed solid immersion lens (SIL) is drawing much attention for its possibility of remarkably increasing recording capacity as a hemispherical SIL made of a medium having a refractive index much higher than 1 is disposed under an objective lens, thereby allowing the number of apertures substantially to be n*NA which is much higher than 1

FIG. 2. is a view of an optical pick-up that can reproduce an optical recording medium supporting a near-field.

Unlike the far-field optical recording medium, the optical pick-up for reproducing a near-field optical recording medium includes a solid immersion lens (SIL) 202.

The principle of the optical pick-up using the SIL 202 will now be described schematically.

Referring to FIG. 2, when a laser is concentrated to the SIL 202 by an objective lens 201, a focus is formed at a bottom inside the SIL 202 with a high refractive index, and its focus spot diameter is decreased in proportional to a refractive index of the SIL 202, so that a spot size smaller than a diffraction limit is obtained.

In general, an optical system includes two types of lenses. One is a free focus lens loaded on a surface of a lift type head and corresponds to an objective lens 202 in the related art optical pick-up. The other one is a hemispherical lens called an SIL 202. The SIL 202 is made of a material with a high refractive index (n) such as glass or the like and is loaded on a lower surface of the lift type head. Also, a coil is disposed to surround the SIL 202.

When a new type of reproducing device of an optical recording medium is developed, interchangeability with the existing type should be considered to be important. If the device has no interchangeability with the exiting type in a market, users may disregard the new type of product and it may become difficult for the new type product to enter the market.

Also, although a reproducing device with interchangeability is developed, a technology of distinguishing between the different types of optical recording media may become an issue.

Particularly, a distance between a bottom of the SIL and a surface of the optical recording medium of the optical pick-up is in tens of nanometers. For this reason, if the kind of inserted media is not accurately recognized in operation of the reproducing device, the optical pick-up or the optical recording medium may be damaged.

In order to avoid such damage, a new method is being demanded for speedily determining the type of optical recording medium in a very simple manner before the operation of a reproducing device having interchangeability is started.

SUMMARY OF THE INVENTION

Accordingly, the present invention is directed to a method for reproducing an optical recording medium that substantially obviates one or more problems due to limitations and disadvantages of the related art.

An object of the present invention is to provide a method for reproducing an optical recording medium of a reproducing device capable of interchangeably reproducing an optical recording medium used in a near-field type using an SIL and an optical recording medium used in a far-field type.

Another object of the present invention is to provide a method for reproducing an optical recording medium capable of safely reproducing an optical recording medium by using a near-field optical pick-up device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for reproducing an optical recording medium, including: reading header information of an inserted optical recording medium by using a first optical pick-up device; and reproducing the optical recording medium when the header information is recognizable, and changing the first optical pick-up device to a second optical pick-up device when the header information is unrecognizable and reading the header information of the optical recording medium.

In another aspect of the present invention, there is provided a method for reproducing an optical recording medium, including: determining a kind of optical pick-up device placed to reproduce an optical recording medium; detecting a push-pull signal or a pre-pit signal of an inserted recording medium according to the kind of optical pick-up device; and reproducing the optical recording medium by using an optical pick-up device from which the push-pull signal or the pre-pit signal is detected.

In a further another aspect of the present invention, there is provided a method for reproducing an optical recording medium, including: detecting header information of the optical recording media by using a near-field optical pick-up device; and determining the optical recording medium to be unreproducable when the header information is not detected, and reproducing the optical recording medium when the header information is detected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
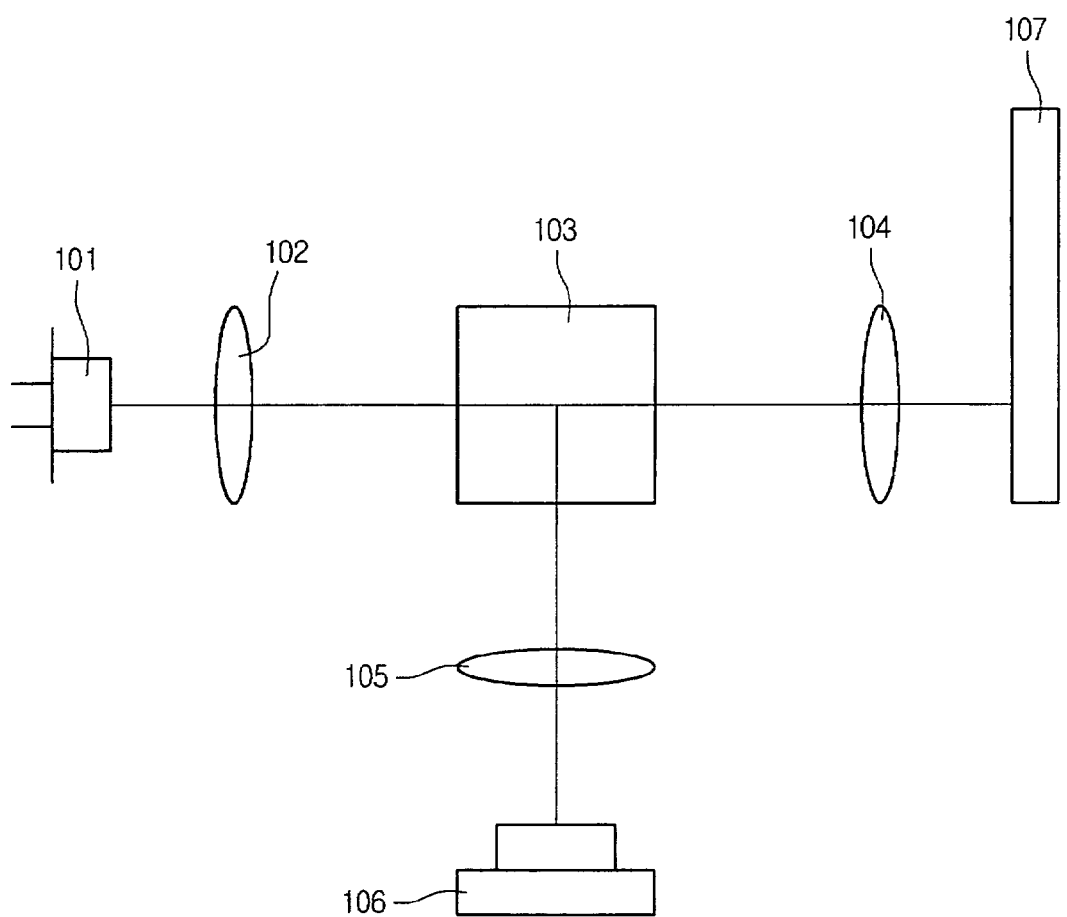
FIG. 1 is a block diagram of an optical pick-up of a reproducing device that may reproduce a far-field optical recording medium.
Figure 2:
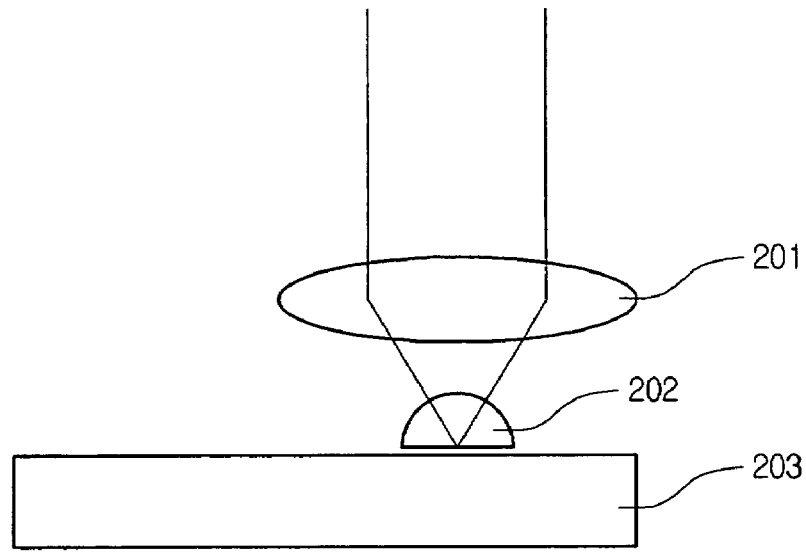
FIG. 2 is a view of an optical pick-up that can reproduce a near-field optical recording medium.
Figure 3:
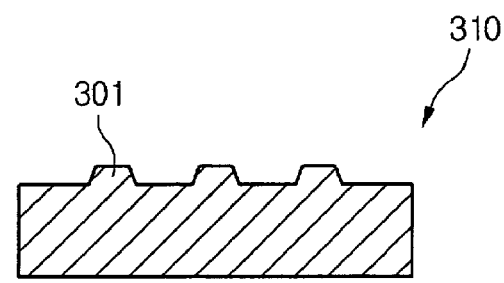
FIGS. 3 and 4 illustrate an optical disc used in the near-field type and an optical disc used in the far-field type.
Figure 4:
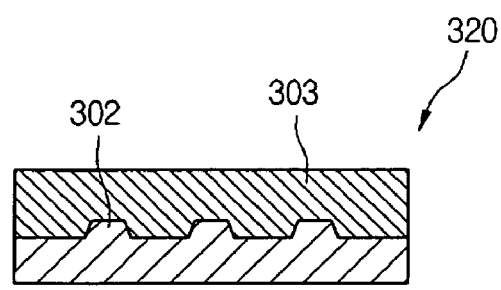

FIGS. 3 and 4 illustrate an optical disc used in the near-field type and an optical disc used in the far-field type.

As shown in FIG. 3, the optical disc 310 used in the near-field type has a pit (ROM)/groove structure (−R, RW) 301 or the like. AS shown in FIG. 4, the optical disc 320 used in the far-field type has a pit/groove structure 302 at its middle layer and a cover layer 303 with a certain thickness thereon.

Therefore, when a near-field optical pick-up unit approaches the optical disc 320 used in the far-field type, collision occurs between the optical pick-up unit and the cover layer 303 of the optical disc 320. Also, when a far-field optical pick-up unit approaches the optical disc 310 used in the near-field type, a desired signal may not be obtained by spherical aberration or the like even if reproduction itself is possible.

Accordingly, it is important to place a suitable optical pick to a kind of optical disc within a reproducing device having interchangeability. Prior to describing a method therefor, an optical-disc recognizing method of optical pick-up units respectively supporting the far-field type and the near-field type will now be described.

Figure 5:
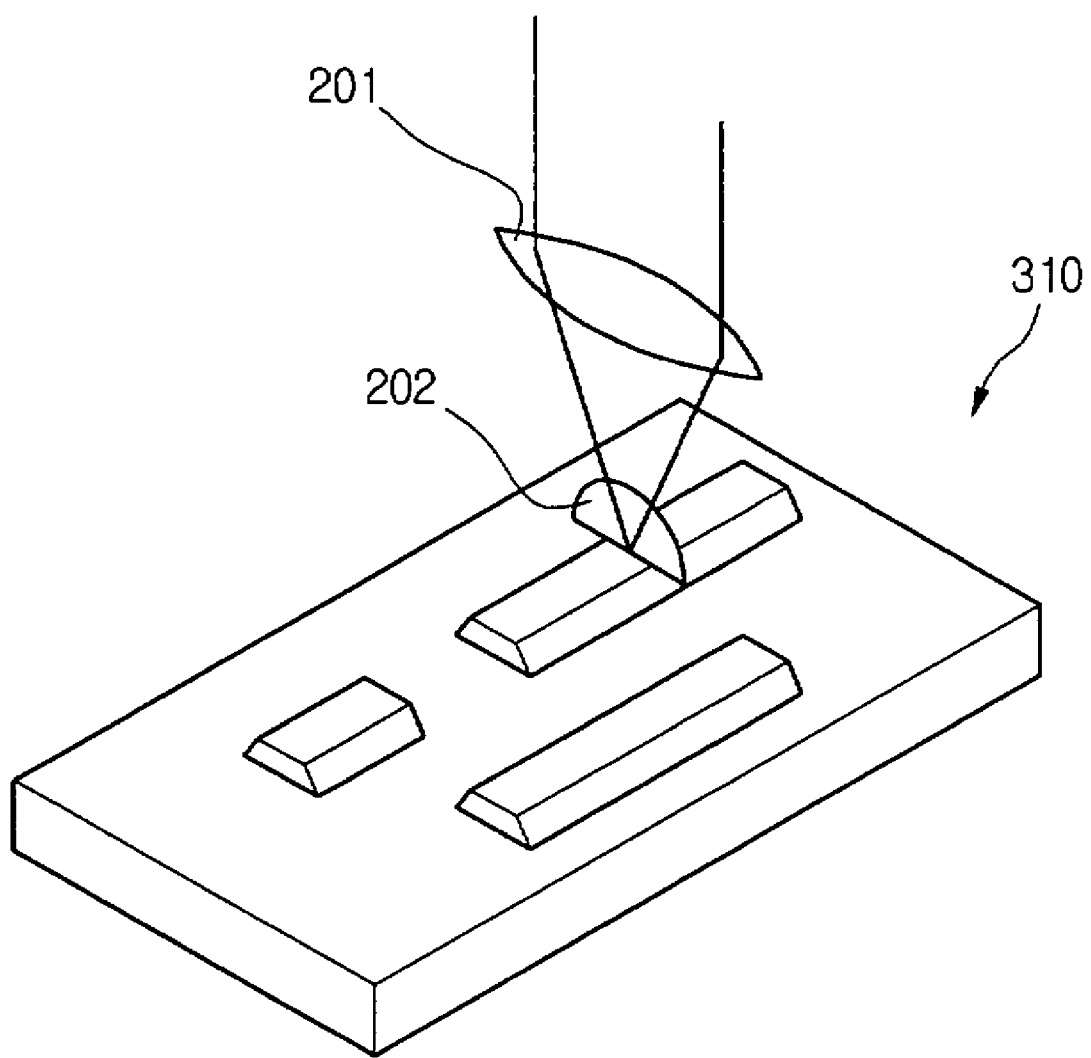
FIGS. 5 and 6 illustrate a method in which a near-field optical pick-up device including a coupled objective lens and solid immersion lens reproduces an optical disc used in the near-field type and an optical disc used in the far-field type.
Figure 6:
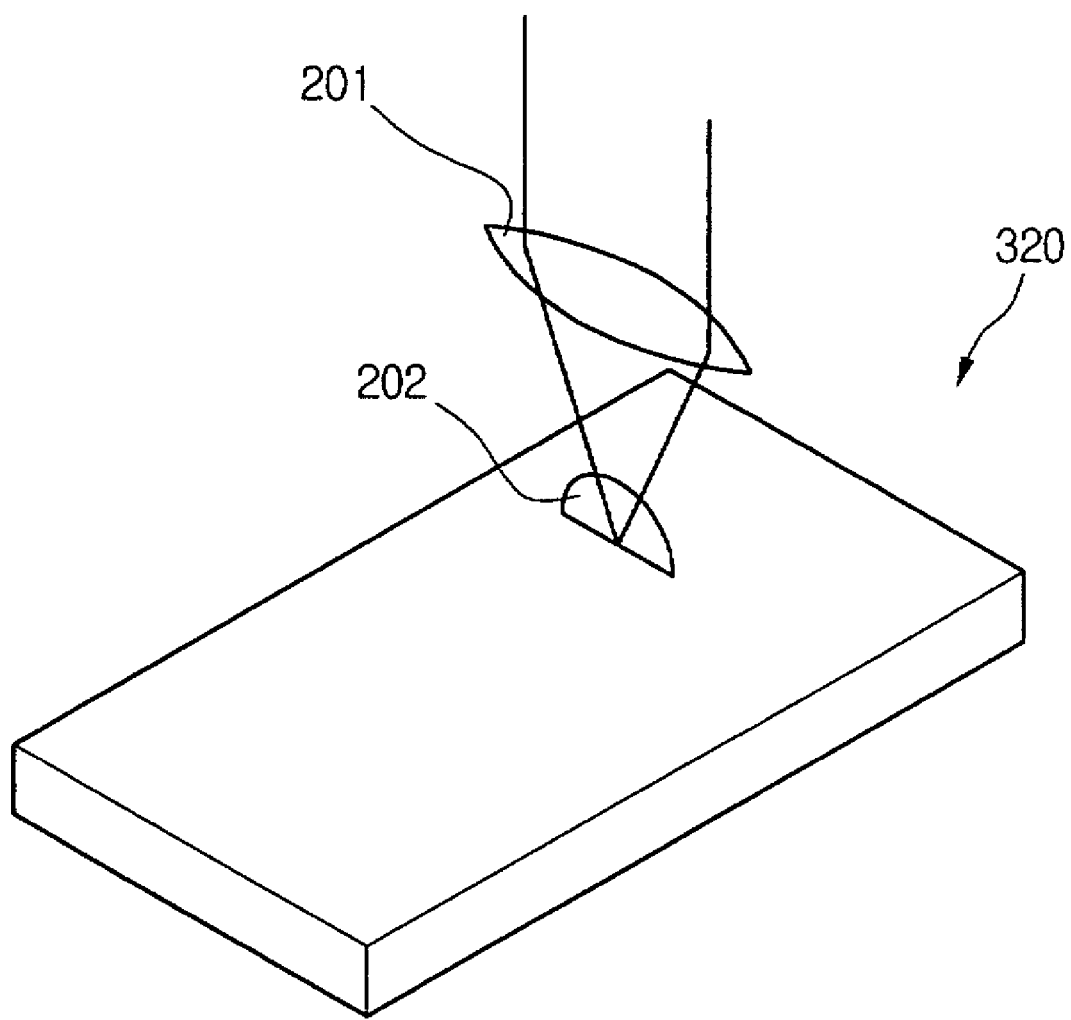

FIGS. 5 and 6 illustrate a method in which a near-field optical pick-up device having a coupled objective lens 301 and solid immersion lens 302 reproduces an optical disc used in the near-field type and an optical disc used in the far-field type.

Referring to FIGS. 5 and 6, the near-field optical pick-up scans a surface of an optical disc in a vertical direction of a track and checks whether or not a push-pull signal (difference signal of right and left photo diodes) is generated, thereby determining the kind of optical disc. In the case of the optical disc 310 used in the near-field type, the push-pull signal is generated during track-crossing scanning because of its pit/groove structure on a surface. However, in the case of the optical disc 320 used in the far-field type, the push-pull signal cannot be obtained because its surface is flat due to a cover layer.

Figure 7:
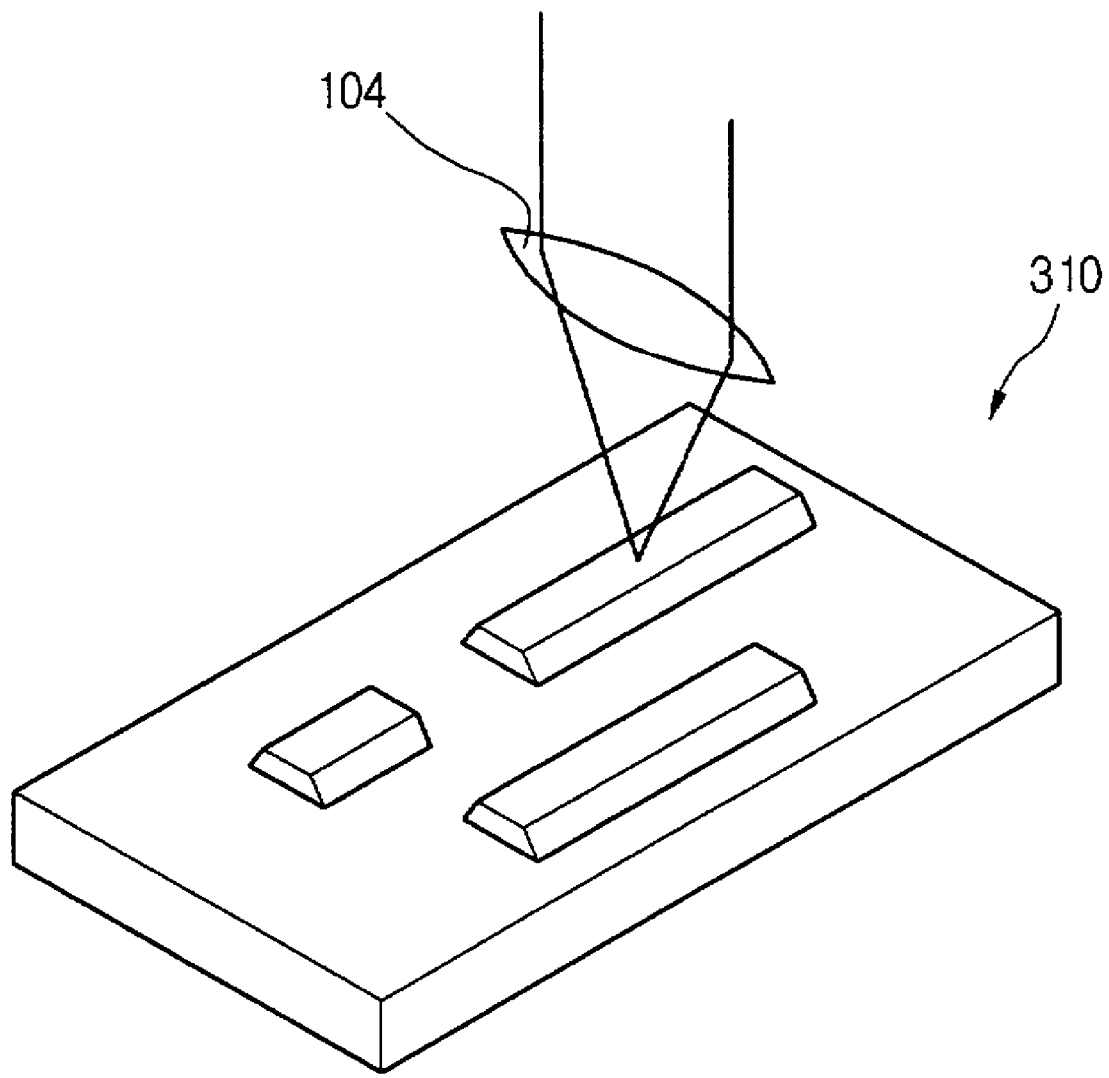
FIGS. 7 and 8 illustrate a method in which a far-field optical pick-up device reproduces an optical disc used in the near-field type and an optical disc used in the far-field type.
Figure 8:
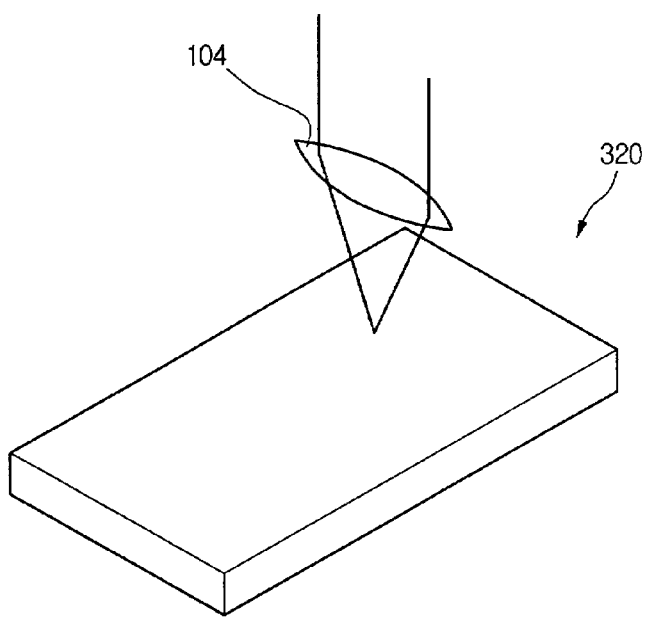

FIGS. 7 and 8 illustrate a method in which the far-field optical pick-up device reproduces an optical disc used in the near-field type and an optical disc used in the far-field type.

The far-field optical pick-up unit reproduces a pre-pit part on a header portion of the optical disc, thereby determining the kind of optical disc. In the case of the optical disc 310 used in the near-field type, although a pre-pit exists, its length is within a range of about ½~¼ of a pre-pit length of the optical disc used in the far-field type, which is below a diffraction limit, thereby exceeding resolution of the far-field optical pick-up unit. Also, because the optical disc 310 used in the near-field type has no cover layer, high spherical aberration is generated and accordingly, reproducing an image becomes impossible. In the case of the optical disc 320 used in the far-field type, a pre-pit is reproduced, thereby determining information of the optical disc 320.

Figure 9:
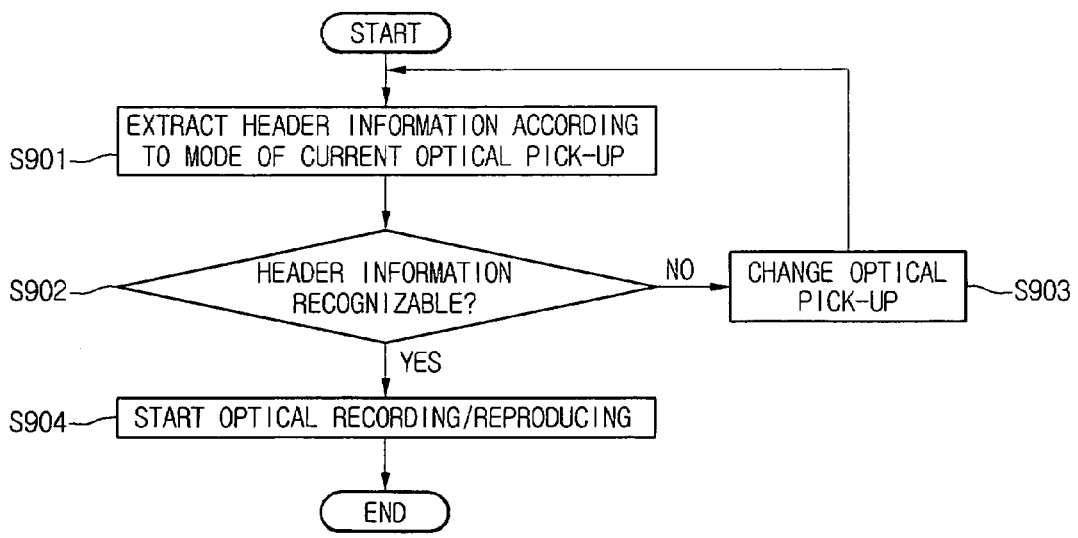
FIG. 9 is a view of a method for reproducing an optical recording medium according to an embodiment of the present invention.

FIG. 9 illustrates a method of reproducing an optical recording medium according to an embodiment of the present invention.

First, header information is extracted according to a mode of a current pick-up (S901).

If the header information is recognizable, optical recording/reproducing is performed on an optical disc. If the header information is unrecognizable, the optical pick-up is changed according to the kind of optical recording medium (S902), (S903) and (S904).

Hereinafter, the more detailed embodiment of the operations (S901) and (S902) of determining the kind of optical recording medium and reproducing the optical recording medium accordingly, will now be described.

Figure 10:
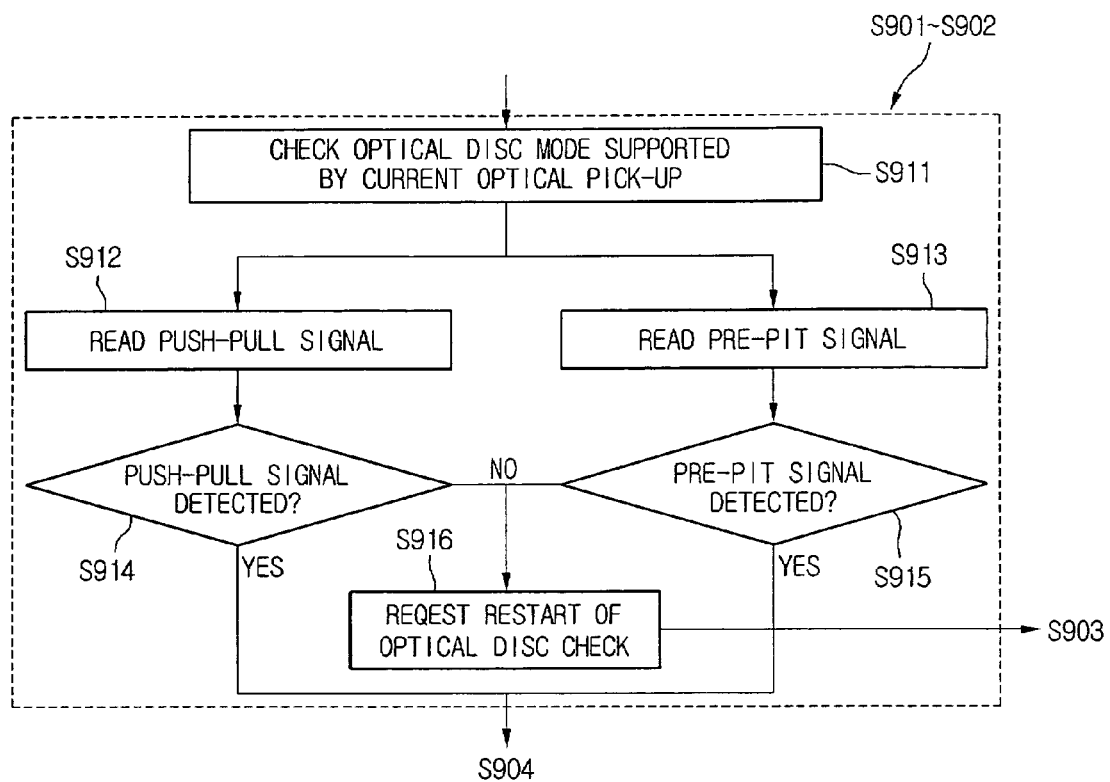
FIG. 10 is a view of a method for reproducing an optical recording medium according to the embodiment of the present invention.

FIG. 10 illustrates the method for reproducing the optical recording medium according to the embodiment of the present invention.

Referring to FIG. 10, a mode of a current optical pick-up device is checked (S911). Namely, it is determined whether the optical pick-up device set to reproduce an optical disc adopts the far-field type or the near field type, and the optical pick-up device reads a predetermined signal in order to bring header information from the optical disc.

Whether the optical pick-up device adopts the far-field type or the near-field type can be determined by checking whether an SIL is placed on an optical axis. For example, it can be checked mechanically or electronically whether or not the SIL is moved. The mode of the optical pick-up device can be informed according to the position of the SIL.

First, when the optical pick-up device is set as a near-field optical pick-up, the optical pick-up device reads a push-pull signal from the optical disc (S912). Here, when the push-pull signal is detected, reproduction of the optical recording medium is started (S914) (S904).

If the push-pull signal is not detected, the kind of optical disc is checked again (S916). Namely, the optical pick-up device is changed to a far-field optical pick-up, and then a pre-pit signal is read (S913).

When the optical pick-up device is set as a far-field optical pick-up, the optical pick-up device reads a pre-pit signal from an optical disc (S913). Here, it the pre-pit signal is detected, reproduction of the optical recording medium is started (S915) (S904).

If the pre-pit signal is not detected, the kind of optical disc is checked again (S916). Namely, the optical pick-up device is changed to a near-field optical pick-up and then a push-pull signal is read (S912).

Although the embodiment configured to allow the optical pick-up device to reproduce an optical disc in the near-field type and far-field type, the present invention may be effectively used for an optical pick-up device that may reproduce only in the near-field type.

For example, it is determined that an optical disc cannot be reproduced when an SIL is placed on an optical axis and a push-pull signal is not detected as a result of detection thereof.

Accordingly, damage to an optical device can be prevented from occurring in a process of trying to reproduce an optical disc reproduced in the far-field type with a near-field type optical pick-up device.

In the present invention, an optical disc reproduced in the near-field type is distinguished from an optical disc reproduced in the far-field type, so that an optical pick-up that interchangeably adopts the near-field type and the far-field type can perform speedy and safe reproduction of optical disc according to the kind of optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for optically reproducing data from an optical recording medium, comprising:
    distinguishing a type of an optical pick-up device;
    determining a manner for distinguishing a type of the optical recording medium according to the distinguished type of the optical pick-up device;
    performing a detection of either a push-pull signal or a pre-pit signal from the optical recording medium according to the determined manner; and
    switching the optical pick-up device from the distinguished type of optical pick-up device to another type of optical pick-up device when the detection of the push-pull signal or the pre-pit signal has failed.

2. The method of claim 1, wherein the step of distinguishing comprises:
    checking whether a SIL (solid immersion lens) is placed on an optical axis.

3. The method according to claim 1, wherein the step of determining a manner for distinguishing a type of optical recording medium according to the distinguished type of optical pick-up device comprises:
    determining the manner to be a detection of the push-pull signal if the distinguished type of optical pick-up device is a near field type.

4. The method according to claim 1, wherein the step of determining a manner for distinguishing a type of optical recording medium according to the distinguished type of optical pick-up device comprises:
    determining the manner to be a detection of the pre-pit signal if the distinguished type of optical pick-up device is a far field type.

5. The method according to claim 1, further comprising:
    reproducing the optical recording medium with the switched optical pick-up device.

6. A device configured to optically reproduce data from an optical recording medium, comprising:
    an optical pick-up device;
    a controller configured to
        distinguish a type of the optical pick-up device;
        determine a manner for distinguishing a type of the optical recording medium according to the distinguished type of the optical pick-up device;
        perform a detection of either a push-pull signal or a pre-pit signal from the optical recording medium according to the determined manner; and
        switch the optical pick-up device from the distinguished type of optical pick-up device to another type of optical pick-up device when the detection of the push-pull signal or the pre-pit signal has failed.

7. The device of claim 6, wherein the controller is configured to
    determine the manner to be a detection of the push-pull signal if the distinguished type of optical pick-up device is a near field type, and
    determine the manner to be a detection of the pre-pit signal if the distinguished type of optical pick-up device is a far field type.

* * * * *